United States Patent [19]

Ukai et al.

[11] Patent Number: 4,753,423

[45] Date of Patent: Jun. 28, 1988

[54] SYNTHETIC RESIN-COATED SPRING AND METHOD FOR MAKING SAME

[75] Inventors: Kenji Ukai, Kamakura; Katsumi Yano, Yokohama; Nobumasa Umezawa, Funabashi; Satoru Yamaguchi, Kamagaya; Takao Itoga, Yokohama, all of Japan

[73] Assignees: Nippon Petrochemicals Co., Ltd; Mitsubishi Steel Manufacture Co., Ltd., both of Tokyo, Japan

[21] Appl. No.: 869,033

[22] Filed: May 30, 1986

[30] Foreign Application Priority Data

Jun. 3, 1985 [JP] Japan .................................. 60-118708
Feb. 19, 1986 [JP] Japan .................................... 61-32740

[51] Int. Cl.⁴ ........................ F16F 1/04; B05D 1/06; B05D 1/24; B32B 15/00
[52] U.S. Cl. .................................. 267/286; 267/167; 427/27; 427/185; 428/379
[58] Field of Search ............... 267/148, 149, 33, 61 R, 267/166, 167, 174, 182, 60, 61 S, 152, 153, 286; 427/27, 185, 195; 524/517; 525/256, 262; 428/424.4, 424.8, 500, 423.7, 379, 394

[56] References Cited

U.S. PATENT DOCUMENTS

| | | | |
|---|---|---|---|
| 3,985,097 | 10/1976 | Sitton | 427/185 X |
| 4,345,004 | 8/1982 | Miyata et al. | 427/27 X |
| 4,407,893 | 10/1983 | Malizio | 427/195 X |
| 4,480,008 | 10/1984 | Farranato et al. | 427/27 X |
| 4,612,249 | 9/1986 | Packer et al. | 427/195 X |
| 4,673,620 | 6/1987 | Shulman et al. | 428/379 |

FOREIGN PATENT DOCUMENTS

| | | | |
|---|---|---|---|
| 0069123 | 4/1982 | Japan . | |
| 0136971 | 8/1982 | Japan . | |
| 0094647 | 6/1983 | Japan | 267/148 |
| 8500207 | 1/1985 | World Int. Prop. O. | 267/148 |

Primary Examiner—Andres Kashnikow
Assistant Examiner—Robert J. Oberleitner
Attorney, Agent, or Firm—Bucknam & Archer

[57] ABSTRACT

A synthetic resin-coated spring comprising a spring body and a synthetic resin coating layer formed on the spring body. The synthetic resin coating layer contains an olefin polymer modified with an unsaturated carboxylic acid or a derivative thereof. A method for making the coated spring is also described.

15 Claims, 2 Drawing Sheets

SYNTHETIC RESIN-COATED SPRING AND METHOD FOR MAKING SAME

BACKGROUND OF THE INVENTION

1. Field of the Invention

This invention relates to synthetic resin-coated springs which have a good self-silencing property or damping effect and a good corrosion resistance, and also to a method for making such springs as mentioned above.

2. Description of the Prior Art

Springs have heretofore widely been used as an industrial part in the fields of automobiles and other vehicles. Among such springs, there are coil springs which are used in a suspension system between the axle and the body of automobiles. The coil springs serve as a cushion between the axle and the body and function as an important part in the automobile. These conventional coil springs raise a problem that they will collide with each other when suffering vibrations, shocks and the like produced during the travel of automobiles thereby to make a clattering noise.

Moreover, the coil springs tend to undergo corrosion by the action of moisture or an electrolytic solution, such as a road antifreezing agent, with an attendant problem that there is the fear of spring breakage caused by corrosion fatigue.

In order to solve the above problems, there have been used coil springs wound with a polyurethane sheet or sheathed in a rubber or resin tube. However, the winding or sheating is conducted by hands, so that the operation is complicated and is not economical. In addition, the adhesion of the sheet or tube to the coil spring is not satisfactory, thus making it difficult to effectively prevent the penetration of water into between the sheet or tube and the spring. On the other hand, there have been proposed methods comprising coating coil springs with resins in, for example, Japanese Laid-open Patent Application Nos. 57-69123 and 57-136971, and methods comprising using adhesives and/or sealing agents between such a sheet or tube and the spring. However, these coil springs are poor in durability under severe service conditions where they are subjected to repeated stress. Thus, good results cannot be expected.

SUMMARY OF THE INVENTION

It is therefore an object of the invention to provide synthetic resin-coated springs which will make less noises on their expansion and contraction occurring at the time of the travel of motor vehicles provided with the springs, this indicating that these springs are excellent in self-silencing property. It is another object of the invention to provide synthetic resin-coated springs which have a high adhesion strength between the spring body and the coating, so that high durability will be ensured even when used under such severe conditions where stress is repeatedly applied as in the suspension system of automobiles.

It is a further object of the invention to provide synthetic resin-coated springs whose coating will substantially not cause cracks under the severe conditions mentioned above.

It is a still further object of the invention to provide synthetic resin-coated springs which have high resistance to chipping and high resistance to corrosion or brine.

It is still another object of the invention to provide a method for making springs of the type mentioned above.

The above objects can be attained, according to the invention, by a synthetic resin-coated spring which comprises a spring body and a synthetic resin coating containing an olefin polymer modified with an unsaturated carboxylic acid or a derivative thereof, the synthetic resin coating being formed on the surface of the spring body.

Preferably, a thermosetting resin is formed on the spring body prior to the formation of the resin layer thereon to further improve the resistance to corrosion of the spring.

Moreover, the present invention provides a method for making a synthetic resin-coated spring which comprises forming a synthetic resin coating on a spring body from a synthetic resin powder containing an olefin polymer modified with an unsaturated carboxylic acid or a derivative thereof by a powder coating technique.

DESCRIPTION OF THE DRAWINGS

The invention will now be described with reference to the accompanying drawings of which.

DETAILED DESCRIPTION AND EMBODIMENTS OF THE INVENTION

The springs suitable for the purpose of the invention may be any types of springs and include, for example, coil springs of cylindrical and conical forms, torsion springs, rod torsion springs, spiral springs, flat springs, lamellar springs, torsion bars and ring springs. In particular, the resin coating of the invention will give a remarkable effect when applied to coil springs which are to be used under severe conditions where stress is exerted at the time of the travel of vehicles.

Figure 1:
FIG. 1 is a side elevation of a coil spring according to the invention.
Figure 2:
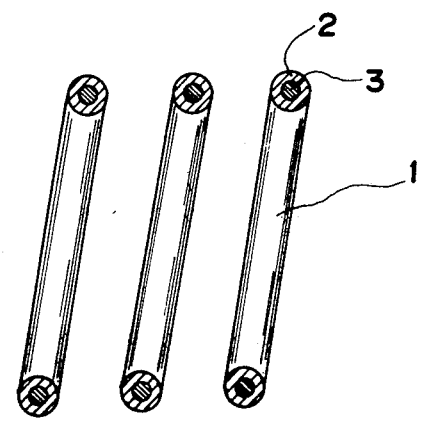
FIG. 2 is a sectional elevation of a coil spring according to the invention.
Figure 3:
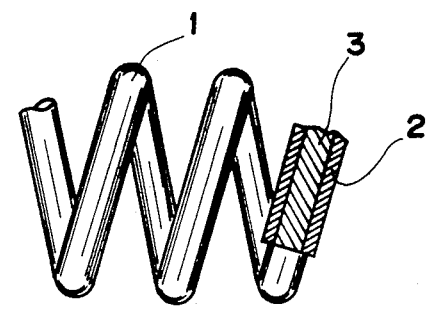
FIG. 3 is a side elevation, partly in section to show constructional detail, of a coil spring according to the invention.

Numeral 1 in FIGS. 1–3 designates a coil spring according to the invention.

Numeral 2 designates the synthetic resin coating which is formed on the surface of a spring body 3.

The coating formed on the spring should comprise modified olefin polymers. The modified and unmodified olefin polymers include, for example, olefin homopolymers such as polyethylene, polypropylene, polybutene-1 and poly 4-methylpentene-1; copolymers of ethylene, propylene, butene-1, 4-methylpentene-1, hexene-1 and actene-1; ethylene and vinyl ester copolymers such as ethylene-vinyl acetate copolymers; and copolymers of ethylene and unsaturated carboxylic acids or unsaturated carboxylic esters such as ethylene-ethyl acrylate copolymers, ethylene-acrylic acid copolymers, ethylene-glycidyl methacrylate copolymers and ethylene-maleic acid copolymers. Of these, there are preferably used copolymers of ethylene and an alpha-olefin having 3 to 12 carbon atoms, with a copolymer density ranging from 0.86 to 0.94 g/cm$^3$ (the copolymer being generally called linear low density polyethylene), ethylene copolymers such as ethylene-vinyl acetate copolymers and ethylene-ethyl acrylate copolymers, and mixtures thereof. In view of the processability, the olefin polymers should preferably have a melt index of from 0.01 to 50 g/10 minutes, more preferably from 0.1 to 20 g/10 minutes.

The unsaturated carboxylic acids used in the practice of the invention include, for example, monobasic or dibasic acids such as acrylic acid, methacrylic acid, maleic acid, fumaric acid, crotonic acid, itaconic acid and citraconic acid and the like.

Examples of unsaturated carboxylic derivatives include metal salts, amides, imides, esters and anhydrides of the above-indicated unsaturated carboxylic acids, of which maleic anhydride is the preferable.

The olefin polymers modified with the unsaturated carboxylic acids or derivatives thereof (these acids or derivatives being hereinafter referred to simply as unsaturated carboxylic acids) are those resins in which 0.05 to 10 wt %, preferably from 0.1 to 5.0 wt %, of the unsaturated carboxylic acid is addition reacted with one or more olefin polymers in the presence of an organic peroxide. The amounts less than 0.05 wt % of the acid addition reacted are unfavorable because of the poor adhesiveness of the resulting modified polymers. On the other hand, when the amount of the unsaturated carboxylic acid addition reacted exceeds 10 wt %, it is likely that a decomposition and/or crosslinking reaction will take place in addition to the addition reaction. In this case, gelation is also likely to occur with the attendant lowering of adhesiveness and degradation of the surface of the resulting coating.

The addition reaction can be carried out by any suitable method and is carried out, for example, by a method in which the starting materials are mixed together, melted and reacted in the absence of a solvent in an extruder or a kneader such as a Banbury mixer. Alternatively, the starting materials may be mixed under heating conditions in a solvent. The solvent includes an aromatic hydrocarbon such as benzene, xylene or toluene, and an aliphatic hydrocarbon such as hexane, heptane or octane. In view of simplicity in operation and excellency in economy, the reaction in an extruder is preferred.

The organic peroxides used for the addition reaction include, for example, benzoyl peroxide, lauryl peroxide, azobisisobutyronitrile, dicumyl peroxide, t.-butyl hydroperoxide, $\alpha,\alpha'$-bis(t.-butyl peroxy diisopropyl)benzene, di-t.-butyl peroxide and 2,5-di(t.-butylperoxy)hexine. The peroxide is used in an amount of from 0.005 to 2.0 parts by weight, preferably from 0.01 to 1.0 part by weight, per 100 parts by weight of the olefin polymer. With amounts less than 0.005 parts by weight, the modification does not substantially proceed. With amounts over 2.0 parts by weight, it is difficult to obtain a further effect and an excessive decomposition or crosslinking reaction may bring about.

The reaction temperature is suitably selected in consideration of temperature conditions ordinarily used for these purposes, e.g. deterioration of the resin, decomposition of unsaturated carboxylic acids, and decomposition temperatures of organic peroxides. In general, the reaction temperature ranging from 150° to 300° C. is used.

For the preparation of the modified olefin polymer, there are used a process comprising suitably mixing different types of unmodified olefin polymers and then modifying the thus obtained mixture, and a process comprising suitably mixing different types of modified olefin polymers. The modified olefin polymers may be used in forming a synthetic resin coating according to this invention or may be mixed with unmodified olefin polymers of the same or different type to be used for the same purpose as above. In the latter case, a modified olefin polymer and an unmodified olefin polymer may be mixed in an arbitrary ratio. Preferably, the mixing ratio by weight of the modified olefin polymer to the unmodified olefin polymer is from 1:99 to 50:50, preferably from 10:90 to 45:55, in view of the adhesiveness and the self-silencing property.

Aside from the modified olefin polymers, the resin coating material according to this invention may further comprise synthetic rubbers, natural rubbers and mixtures thereof, whether they are unmodified or modified with unsaturated carboxylic acids or derivatives thereof. Examples of such rubbers include solid rubbers such as polyisobutylene, butyl rubbers, ethylene-propylene rubbers, ethylene-propylene-dien rubbers, styrene-butadiene rubbers, polybutadiene rubbers, chloroprene rubbers, urethane rubbers, ethylene-vinyl acetate rubbers and natural rubbers, liquid rubbers such as liquid polybutadiene, and mixtures thereof. These unmodified or modified rubbers contribute to improve the self-silencing property and the adhesiveness.

The ingredients may be mixed or formulated without limitation and are generally mixed by the use of ordinary kneading machines such as a ribbon blender, a high-speed mixer, a kneader, a mixing roll, a Banbury mixer and an extruder.

When importance is placed on the self-silencing property and durability as will be required in coil springs, it is preferred to use a mixture of an ethylene copolymer having polar groups, such as ethylene-vinyl acetate copolymer or ethylene-ethyl acrylate copolymer, and an ethylene-alpha-olefin copolymer, such as ethylene-propylene copolymer or ethylene-butene-1 copolymer, having a density of from 0.86 to 0.94 g/cm$^3$.

The ethylene copolymers having polar groups are effective particularly in improving the adhesiveness and the self-silencing property. On the other hand, the ethylene-alpha-olefin copolymers are effective particularly in improving the durability and the adhesiveness.

The coating of a mixture of both types of the above copolymer resins in a suitable ratio can improve the self-silencing quality, adhesiveness and durability in a well-balanced condition and ensures strong adhesion, thus leading to a good resistance to corrosion.

The mixing ratio by weight of the ethylene copolymer having polar groups and the ethylene-alpha-olefin copolymer is 100–50:0–50. In this connection, at least one resin should be modified.

For the formation of a coating on a spring surface, the spring should be cleaned on the surface thereof. Preferably, the spring is subjected to blasting or chemical treatment.

In order to form a synthetic resin coating on the spring surface, there may be used several methods including a method comprising spirally winding a synthetic resin film or sheet about the spring and fusion fixing the wound resin on the surface of the spring, a method comprising forming the coating by extrusion, and a method comprising applying the resin after dissolution in solvents. Preferably, the resin is converted into fine powder and coated on the surface of the spring body by the use of the following coating methods. The use of the powdered resin enables one to form a coating layer which is adhered to a curved spring uniformly and firmly.

The conversion into powder may be carried out as usual. More specifically, the resin may be powdered by either a mechanical powdering method or a dissolution and precipitation method. The size of the powder is generally in the range of from 50 to 350 micrometers, preferably from 70 to 300 micrometers in order to form a coating which is uniformly and firmly adhered to a spring body.

Figure 4:
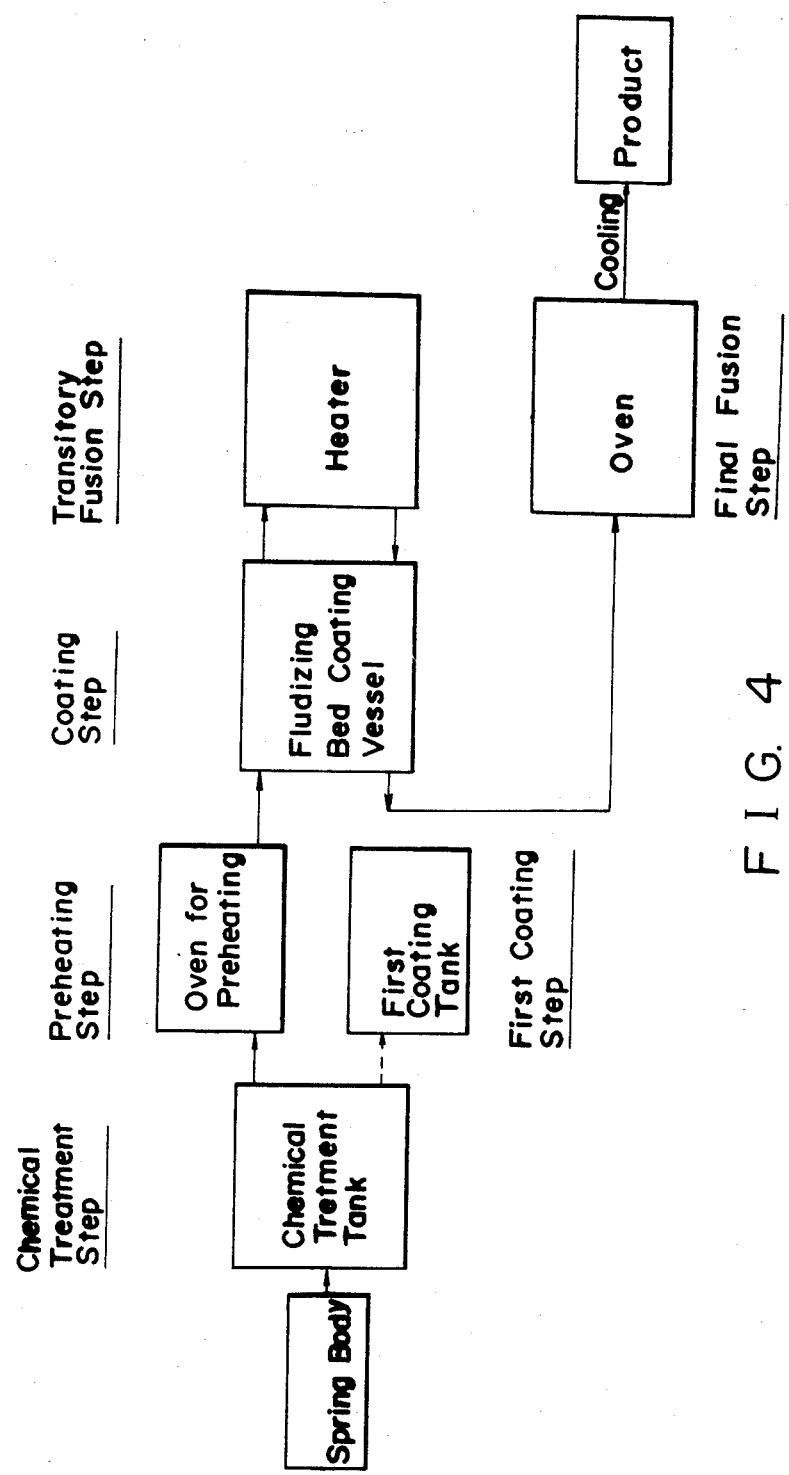
FIG. 4 shows a process of the formation of a coating on a spring surface.

The coating methods using the powder are known as a powder coating technique. Examples of such a technique include a fluidized bed coating, an electrostatic-fluidized bed coating and a powder fusion ejecting, an electrostatic powder coating technique. The thickness of the coating varies depending on the use conditions of a spring applied. Taking the self-silencing quality and chipping resistance into consideration, the thickness is generally at least 100 micrometers, preferably from 100 micrometers to 3 mm. The process of the formation of a coating on a spring surface is shown in FIG. 4.

In order to improve the corrosion resistance, it is preferred to allow a thermosetting resin layer to intervene between the synthetic resin coating and the spring body surface. In this case, the first coating step is inserted between the chemical treatment step and the preheating step as shown in FIG. 4.

The thermosetting resins useful in the present invention include, for example, epoxy resins, melamine resins, unsaturated polyester resins, urethane resins, alkyd resins, thermosetting acrylic resins and phenolic resins. These resins may be used singly or in combination. Of these, phenolic resin-epoxy resins, urea resin-epoxy resins, melamine resin-epoxy resins, amino resin-alkyd resins, melamine resin-alkyd resins, polyurethane resins, phenolic resin-epoxy resin-vinyl resins, and adhesives made of these resins are preferred as coating materials. In addition, appropriate curing agents may be added.

The thickness of the thermosetting resin is in the range of approximately from 5 to 100 micrometers, within which a good corrosion resistance (brine resistance) can be imparted although a higher thickness may be used. A coating of the thermosetting resin is formed by coating the above-indicated coating materials of the solvent, dispersion or solvent-free type on spring bodies by means of a known coating method.

In cases where the thermosetting coating material is used, the thermosetting resin is first coated on the surface of a spring body and the synthetic resin according to this invention is then coated on said coated thermosetting resin. If necessary, a thermoplastic resin or rubber which is the same as or different from that used in the synthetic resin may be coated to form an outermost layer.

Since the thermosetting resin is cured by heating, it may be cured by heating immediately after the application thereof, followed by the formation of a coating of the synthetic resin according to this invention in a subsequent step. Alternatively, the thermosetting resin may be cured simultaneously with heating for the formation of the synthetic resin coating. The term "the synthetic resin" used herein is intended to mean the synthetic resin comprising the modified olefin polymer(s) according to this invention.

As mentioned above, thermoplastic synthetic resins or rubbers may be further coated on the synthetic resin coating. Examples of the thermoplastic resins used for these purposes include synthetic resins such as the afore-defined olefin polymers, polyamide resins, polyvinylidene chloride resins, saponified products of ethylene-vinyl acetate copolymers, polyester resins, polyvinyl chloride resins, polystyrene resins, ABS resins, polycarbonate resins, polyvinyl alcohol resins and fluorine resins, synthetic rubbers such as ethylene-propylene copolymer rubbers, ethylene-propylene-dien copolymer rubbers, polybutadiene rubbers, butadiene-styrene copolymer rubbers, butadiene-acrylonitrile rubbers, polychloroprene rubbers, acryl rubbers and silicone rubbers, and natural rubbers.

The resins used as the coating material according to this invention may further comprise various types of additives. The additives include, for example, organic or inorganic fillers, antioxidants, lubricants, organic or inorganic pigments, UV absorbers, dispersants, foaming agents, plasticizers, foam inhibitors, crosslinking agents, flame retarders, flow modifiers and nucleating agents. These additives are added in amounts not considerably impairing the properties inherent to the respective coating materials.

The present invention is more particularly described by way of Examples and Comparative Examples, the former not being construed as limiting the present invention.

In these Examples and Comparative Examples, there are used the following olefin polymers, modified olefin polymers, thermosetting resins, coating methods, and methods of testing the resulting samples for their self-silencing property, durability, corrosion resistance and adhesion strength.

(I) Olefin Polymers (A) Ethylene-ethyl acrylate copolymer (hereinafter abbreviated as EEA) having a density of 0.93 g/cm$^3$, a melt index of 10 g/10 minutes and a content of ethyl acrylate of 20 wt % and being commercially available from Nippon Petrochem. Co., Ltd.

(B) Ethylene-vinyl acetate copolymer (hereinafter abbreviated as EVA) having a density of 0.930 g/cm$^3$, a melt index of 10 g/10 minutes and a content of vinyl acetate of 10 wt % and being commercially available from Nippon Pertochem. Co., Ltd. under the name of Nisseki Rexlon V 550.

(C) Ethylene-butene-1 copolymer (hereinafter abbreviated as LLDPE) having a density of 0.924 g/cm$^3$ and a melt index of 14 g/10 minutes and being commercially available from Nippon Partochem. Co., Ltd. under the name of Nisseki Linirex AJ 5410.

(D) Ionomer resin (trade name: Hi-Milan 1652, by Mitsui Du Pont Polychem. Co., Ltd.)

(II) Thermosetting resins (a) Epoxy resin (trade name: Epikote OL-53-B-40, Shell Inc.)

(b) Melamine-alkyd resin (trade name: Toakaron #1000, by Toa Paint Co., Ltd.)

(c) Urethane resin (trade name: Nippolan 3022, by Nippon Polyurethane Co., Ltd.)

(III) Preparation of modified olefin polymers

One hundred parts by weight of the respective olefin polymers were mixed with 0.25 parts by weight of maleic anhydride and 0.02 parts by weight of dicumyl peroxide and melted and kneaded in an extruder to obtain modified EEA, EVA and LLDPE (hereinafter referred to as MEEA, MEVA and MLLDPE, respectively). The amount of the added maleic anhydride was about 0.2 wt %.

(IV) Coating methods (a) Fluidized bed coating

The modified olefin polymer and/or unmodified olefin polymer was weighed in a predetermined amount indicated in Table 1 and ground by means of a grinding machine to obtain a 60 mesh pass (about 250 micrometers) powder.

This powder was used to coat a chemically treated coil spring or steel plate therewith and dried at normal temperatures, followed by heating to 180° C. and charging into a fluidized bed coating vessel for coating to a predetermined thickness. Thereafter, the coated spring or plate was heated at 180° C. for 10 minutes to obtain a coated article having a uniform coating.

(b) Electrostatic powder coating

The powder prepared above was used to coat a chemically treated coil spring or steel plate, or a coil spring or steel plate which had been coated with a thermosetting resin and dried, in a thickness of 1300 micrometers by application of a voltage of 60 KV, followed by heating at 180° C. for 10 minutes, thereby obtaining a coated article having a uniform coating.

(V) Test methods

1. Self-silencing property and durability

A test in which a coil spring was compressed by application of a load and returned to an original state by removal of the load was repeated at 1000 cycles/minute. Noises generated during the cycles were checked to determine the self-silencing property. The durability was determined as the number of cycles before the coating were cracked.

2. Corrosion resistance

Test A:

A coated steel plate was provided as a test piece and sprayed with a 5% aqueous NaCl solution at 35° C. The time before starting to corrode was measured.

Test B:

A coated steel plate was provided as a test piece and was scratched to a depth of the plate surface and sprayed with a 5% aqueous NaCl solution at 35° C. The time before starting to corrode and peel was measured. (In accordance with JIS Z-2371).

3. Adhesion strength

A steel plate was used as material for a test piece and was coated according to the fluidized bed coating or electrostatic powder coating method, thereby forming a coating on the plate. The coated plate was heated to 180° C. for 10 minutes to form a uniform coating. The coated plate so heat treated was used to make a test piece having a width of 25 mm. The test piece was subjected to a 180° peel test. The peel strength was determined as an adhesion strength.

EXAMPLES 1-3

MEEA was used as a modified olefin polymer and LLDPE was used as an unmodified olefin polymer. One hundred parts by weight of MEEA were mixed with each of 0.30 and 50 parts by weight of LLDPE. The resulting compositions were each coated on a coil spring or a steel plate according to the fluidized bed coating method (a) to obtain a coated article. These articles were evaluated according to the test methods described above. The results are shown in Table 1.

EXAMPLE 4

The general procedure of Example 1 was repeated except that MEVA was used instead of EEA. The results are also shown in Table 1.

EXAMPLE 5

The general procedure of Example 2 was repeated except that the film thickness was 1000 micrometers, with the results shown in Table 1.

EXAMPLE 6

The general procedure of Example 1 was repeated except that MEEA and LLDPE used in Example 2 were used to form a 300 micrometer thick coating composed of a mixture of MEEA and LLDPE, on which a 1000 micrometer thick unmodified LLDPE coating was formed. The evaluation was made in the same manner as in Example 1, with the results shown in Table 1.

EXAMPLE 7-9

The general procedure of Example 1 was repeated except that MEEA or MEVA and MLLDPE were mixed in amounts indicated in Table 1. The evaluation was made in the same manner as in Example 1, with the results shown in Table 1.

EXAMPLE 10

The general procedure of Example 1 was repeated except for using a mixture of 30 parts by weight of MLLDPE and 70 parts by weight of unmodified EEA instead of the MEEA and LLDPE. The evaluation was made in the same manner as in Example 1, with the results shown in Table 1.

EXAMPLE 11

The general procedure of Example 7 was repeated except that the same composition as used in Example 7 was coated by an electrostatic powder coating technique. The evaluation was made in the same manner as in Example 1. The results are shown in Table 1.

COMPARATIVE EXAMPLE 1

The general procedure of Example 1 was repeated, but using an ionomer resin (trade name: Hi-Milan 1652, Mitsui Du Pont Polychem. Co., Ltd.) instead of MEEA. The evaluation was made in the same manner as in Example 1, with the results shown in Table 1.

EXAMPLES 12-14

The MEEA and MLLDPE were provided as the modified olefin polymers and mixed in amounts indicated in Table 2 and an epoxy resin was used as a thermosetting resin. The MEEA, the resulting mixtures and the thermosetting resin were coated, respectively, on a coil spring body or a steel plate according to the fluidized dip coating (a), thereby obtaining coated articles. The articles were evaluated according to the test methods described before, with the results shown in Table 2.

EXAMPLES 15 and 16

The general procedure of Example 13 was repeated, but using thermosetting resins indicated in Table 2 instead of the epoxy resin used in Example 13. The results are shown in Table 2.

EXAMPLE 17

The general procedure of Example 12 was repeated, but using the MEVA instead of the MEEA. The results are shown in Table 2.

EXAMPLE 18, 19

The general procedure of Example 12 was repeated except that the unmodified LLDPE was mixed with The MEEA in predetermined amounts. The results are shown in Table 2.

EXAMPLE 20

The general procedure of Example 13 was repeated except that the thickness of the coating obtained was 1000 micrometers. The results are shown in Table 2.

EXAMPLE 21

The general procedure of Example 13 was repeated except that a mixture of 30 parts by weight of the MLLDPE and 70 parts by weight of the unmodified EEA was used instead of the MEEA and MLLDPE was used. The results are shown in Table 2.

EXAMPLE 22

The general procedure of Example 18 was repeated except that the electrostatic powder coating technique was used. The results are shown in Table 2.

TABLE 1

| Example | Modified Olefin Polymer Kind | Amount (parts by wt.) | Unmodified Olefin Polymer Kind | Amount (parts by wt.) | Thickness of Coating ($\mu$) |
|---|---|---|---|---|---|
| 1 | MEEA | 100 | — | — | 1,300 |
| 2 | MEEA | 70 | C | 30 | 1,300 |
| 3 | MEEA | 50 | C | 50 | 1,300 |
| 4 | MEVA | 100 | — | — | 1,300 |
| 5 | MEEA | 70 | C | 30 | 1,000 |
| 6 | MEEA | 70 | C | 30 | MEEA/LLDPE 300 LLDPE 1000 |
| 7 | MEEA/MLLDPE | 70/30 | — | — | 1,300 |
| 8 | MEEA/MLLDPE | 50/50 | — | — | 1,300 |
| 9 | MEVA/MLLDPE | 70/30 | — | — | 1,300 |
| 10 | MLLDPE | 30 | A | 70 | 1,300 |
| 11 | MEEA/MLLDPE | 70/30 | — | — | 1,300 |
| Com. Ex. 1 | — | — | D | 100 | 1,300 |

| Example | Coating Method | Self-silencing Property (Generation of noise) | Durability (Number of cycles) | Corrosion Resistance (Time) measured in Test A | Adhesion Strength (kg/25 mm in width) |
|---|---|---|---|---|---|
| 1 | (a) | no | 200,000–3000,000 | >1,000 | >10 |
| 2 | (a) | no | >300,000 (no defect) | >1,000 | >10 |
| 3 | (a) | no | >300,000 (no defect) | >1,000 | 9.5 |
| 4 | (a) | slight generation | 200,000–300,000 | >1,000 | >10 |
| 5 | (a) | slight generation | >300,000 (no defect) | >1,000 | >10 |
| 6 | (a) | no | >300,000 (no defect) | >1,000 | >10 |
| 7 | (a) | no | >300,000 (no defect) | >1,000 | >10 |
| 8 | (a) | no | >300,000 (no defect) | >1,000 | >10 |
| 9 | (a) | no | >300,000 (no defect) | >1,000 | >10 |
| 10 | (a) | no | >300,000 (no defect) | >1,000 | >10 |
| 11 | (b) | no | >300,000 (no defect) | >1,000 | >10 |
| Com. Ex. 1 | (a) | metallic noise generated | >300,000 (no defect) | 1,000 | 7.5 |

TABLE 2

| Example | Modified Olefin Polymer Kind | Amount (parts by wt.) | Unmodified Olefin Polymer Kind | Amount (Parts by wt.) | Thickness of Coating Film ($\mu$) | Thermoplastic Resin Kind | Thickness ($\mu$) |
|---|---|---|---|---|---|---|---|
| 12 | MEEA | 100 | — | — | 1,300 | a | 20 |
| 13 | MEEA/MLLDPE | 70/30 | — | — | 1,300 | a | 20 |
| 14 | MEEA/MLLDPE | 50/50 | — | — | 1,300 | a | 20 |
| 15 | MEEA/MLLDPE | 70/30 | — | — | 1,300 | b | 20 |
| 16 | MEEA/MLLDPE | 70/30 | — | — | 1,300 | c | 20 |
| 17 | MEVA | 100 | — | — | 1,300 | a | 20 |
| 18 | MEEA | 70 | C | 30 | 1,300 | a | 20 |
| 19 | MEEA | 50 | C | 50 | | a | 20 |
| 20 | MEEA/MLLDPE | 70/30 | — | — | 1,000 | a | 20 |

TABLE 2-continued

| 21 | MLLDPE | 30 | A | 70 | 1,300 | a | 20 |
| 22 | MEEA | 70 | C | 30 | 1,300 | a | 20 |

| Example | Coating Method | Self-silencing Property (Generation of noise) | Durability (Number of cycles) | Corrosion Resistance (Time) measured in Test B | Adhesion Strength (kg/25 mm in width) |
|---|---|---|---|---|---|
| 12 | (a) | no | 200,000–300,000 | >1,000 | >10 |
| 13 | (a) | no | >300,000 | >1,000 | >10 |
| 14 | (a) | slight generation | >300,000 | >1,000 | >10 |
| 15 | (a) | no | >300,000 | >1,000 | >10 |
| 16 | (a) | no | >300,000 | >1,000 | >10 |
| 17 | (a) | no | 200,000–300,000 | >1,000 | >10 |
| 18 | (a) | no | >300,000 | >1,000 | >10 |
| 19 | (a) | slight generation | >300,000 | >1,000 | 9.7 |
| 20 | (a) | slight generation | >300,000 | >1,000 | >10 |
| 21 | (a) | no | >300,000 | >1,000 | 9.5 |
| 22 | (b) | no | >300,000 | >1,000 | >10 |

As is seen from the foregoing, the synthetic resin-coated springs of the invention have a good self-silienc-ing property and a high strength of adhesion between the spring body and the coating so that they are durable when in use under such severe conditions where stress is repeatedly exerted thereon as in the suspension system of automobiles. In addition, the springs have high resistance to chipping and high resistance to corrosion and can thus be utilized as industrial parts in various fields of vehicles such as automobiles, ships, aircrafts and the like.

What is claimed is:

1. A synthetic resin-coated metallic coil spring which comprises a spring body and a synthetic resin coating containing an olefin polymer modified with an unsaturated carboxylic acid compound which is a member selected from the group consisting of unsaturated carboxylic acids and derivatives thereof, said synthetic resin coating being formed on the surface of said spring body and said olefin polymer being a member selected from the group consisting of ethylene-alpha-olefin copolymers having a density of from 0.86 to 0.94 g/cm3, ethylene-vinyl acetate copolymers, ethylene-ethyl acrylate copolymers and mixtures thereof.

2. A synthetic resin-coated spring according to claim 1 wherein said compound unsaturated carboxylic acid is maleic acid.

3. A synthetic resin-coated spring according to claim 1, wherein said unsaturated carboxylic acid compound is maleic anhydride.

4. A synthetic resin-coated spring according to claim 1, wherein said synthetic resin coating has a thickness of from 100 micrometers to 3 mm.

5. A synthetic resin-coated spring according to claim 1, wherein the modified olefin polymer is an addition product prepared by modifying the olefin polymer with 0.05 to 10 wt % of said unsaturated carboxylic acid compound.

6. A synthetic resin-coated spring according to claim 1, wherein said synthetic resin coating consists essentially of the modified olefin polymer.

7. A synthetic resin-coated spring according to claim 1, wherein said synthetic resin coating comprises a mixture of the modified olefin polymer and an unmodified olefin polymer in a mixing ratio by weight of 1:99 to 50:50.

8. A synthetic resin-coated spring according to claim 7, wherein the ratio is in the range of 10:90 to 45:55.

9. A synthetic resin-coated spring according to claim 7, wherein said mixture further comprises a member selected from the group consisting of a rubber modified with an unsaturated carboxylic acid compound.

10. A synthetic resin-coated spring according to claim 1, further comprising a thermosetting resin layer formed between the surface of said spring body and said synthetic resin coating.

11. A synthetic resin-coated spring according to claim 10, wherein said thermosetting resin is a member selected from the group consisting of epoxy resins, melamine resins, alkyd resins, urethane resins and mixtures thereof.

12. A synthetic resin-coated spring according to claim 10, wherein said thermosetting resin layer has a thickness of from 5 to 100 micrometers.

13. The spring according to claim 1 wherein in said copolymer of ethylene and alpha-olefin said alpha-olefin contains 3–12 carbon atoms.

14. The spring according to claim 1 wherein said olefin polymer has melt index of 0.01–50 g/10 minutes.

15. A synthetic resin-coated spring according to claim 1, wherein a member selected from the group consisting of a layer of a thermoplastic resin or rubber is further formed on the outer surface of said synthetic resin coating.

* * * * *